US00RE35424E

United States Patent [19]

Seals

[11] E Patent Number: Re. 35,424

[45] Reissued Date of Patent: Jan. 21, 1997

[54] MULTIPURPOSE BICYCLE TOOL KIT

[75] Inventor: Robert L. Seals, Chico, Calif.

[73] Assignee: Fiskars Inc., Madison, Wis.

[21] Appl. No.: 629,989

[22] Filed: Apr. 8, 1996

Related U.S. Patent Documents

Reissue of:

[64] Patent No.: 5,303,439
Issued: Apr. 19, 1994
Appl. No.: 088,139
Filed: Jul. 8, 1993

[51] Int. Cl.[6] ..... B25F 1/02

[52] U.S. Cl. ..... 7/138; 7/165; 7/167; 7/170; 59/7; 81/177.4; 81/DIG. 7; 81/177.2

[58] Field of Search ..... 7/138, 139, 165, 7/167, 170; 59/7; 81/121.1, 177.1, 177.2, 177.4, 180.1, 185.2, 129, 170, DIG. 7

[56] References Cited

U.S. PATENT DOCUMENTS

| | | | |
|---|---|---|---|
| 341,117 | 5/1886 | Wright . | |
| 342,128 | 5/1886 | Parker . | |
| 363,331 | 5/1887 | Hammer | 7/138 |
| 1,000,867 | 8/1911 | Widmayer . | |
| 1,415,326 | 5/1922 | Finkhousen . | |
| 2,091,538 | 8/1937 | Wasseth | 7/138 |
| 3,798,687 | 3/1974 | Stevens . | |
| 3,858,258 | 1/1975 | Stevens . | |
| 4,103,378 | 8/1978 | Granados | 7/138 |
| 4,221,113 | 9/1980 | Jordan . | |
| 4,269,311 | 5/1981 | Rich . | |
| 4,477,936 | 10/1984 | Weston | 7/139 |
| 4,504,993 | 3/1985 | Gamble . | |
| 4,967,435 | 11/1990 | Seals . | |
| 5,146,815 | 9/1992 | Scott, III . | |
| 5,251,341 | 10/1993 | Seals | 7/138 |
| 5,251,352 | 10/1993 | Cullison . | |

OTHER PUBLICATIONS

"CPR Tool"—appeared in an article in a flyer through the mail, dated Jun. 1993.

*Primary Examiner*—James G. Smith
*Attorney, Agent, or Firm*—Foley & Lardner

[57] ABSTRACT

A bicycle tool kit which provides either a number of open end or box style wrenches in a plate-like web attached to an end of an elongated handle. Attached to the top of the handle is a chain link remover for repairing broken links of bicycle chains. The threaded shaft of the chain link remover is adapted for removably retaining a separate deep socket and two allen wrenches, one of which has a screw driver tip. A wrench is also provided for adjusting the tension of the spokes of the bicycle wheels. The bicycle tool kit is structured to be lightweight, compact, and highly portable, and yet still offer most of the tools necessary for making adjustments and repairs to a bicycle should a problem develop while riding.

11 Claims, 12 Drawing Sheets

MULTIPURPOSE BICYCLE TOOL KIT

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to hand tools and more precisely to a multipurpose bicycle repair and maintenance tool kit. The present invention is a compact bicycle tool kit easily carried on the bike or by the rider for use if a breakdown occurs or an adjustment needs to be made on the road.

2. Description of Prior Art

Bicyclists have long been plagued with the problem of minor breakdowns occurring .while riding when they are far from help or access to repair equipment. Because of the excess weight and limited storage space, conventional tools are seldom transported along with the bike for repair and adjustment purposes. The majority of problems occurring on conventional bicycles can be fixed or adjusted with only a few specific tools. Combining these specific tools into one lightweight compact unit would be particularly useful to the biker which is the purpose of the immediate invention.

A past art patent search was conducted at the U.S. Patent Office to examine kits and combination tools which included specific tools required for certain areas of bicycle repair. Most multipurpose tools and kits specifically for bicycle use appeared inadequate. Of those patents examined. the following were considered most pertinent to my invention: J.L. Weston was granted U.S. Pat. No. 4,477,936, on Oct. 23. 1984, for a multi-purpose bicycle tool. Although this device contains several useful tools, it does not contain a chain link remover which is vital for repairing a broken bike chain, nor does it contain any allen wrenches for seat adjustments.

Several past art devices included tools primarily for removal of links from chains without including other tool combinations. Typical of these tools is the R.C. Jordan device, patented in the U.S. on Sep. 9, 1980, U.S. Pat. No. 4,221,113, and the tool shown in a U.S. patent issued to J.F. Granados, on Aug. 1, 1978, U.S. Pat. No. 4,103,378. Granados discloses a tool principally designed for chain breaking which also has tool parts for tightening wheel spokes and for trueing or dishing bicycle wheels.

None of the above mentioned past art devices included sufficient tools needed for many of the basic repair problems prevalent to bicycles.

Suitable multipurpose bicycle tools or tool kits have been invented in the past, such as my multipurpose bicycle tool kit taught in my U.S. Pat. No. 4,967,435 issued Nov. 6, 1990. My tool kit disclosed in U.S. Pat. No. 4,967,435 utilizes an adjustable open end wrench, which does function as desired reasonably well, however, adjustable open end wrenches may be considered somewhat expensive to manufacture when compared to some structures, and additionally, when not properly adjusted, have been known to round-off nuts or bolt heads. The immediate invention of this disclosure is an improved multipurpose bicycle tool kit similar to that taught in my U.S. Pat. No. 4,967,435, only the invention of this disclosure utilizes a plate-like web having either a plurality of open end or box style wrenches, or a combination of both as a replacement for the adjustable open end wrench of my previous invention.

My U.S. Pat. No. 4,967,435 issued Nov. 6, 1990 is incorporated herein by reference for both essential and nonessential material.

SUMMARY OF THE INVENTION

In practicing my immediate invention. I have provided an improved multipurpose bicycle tool kit useful during repair work on bicycles and for adjustment of bicycle parts. The kit according to the immediate invention combines the bicycle oriented tools most often needed for field service work into a light weight kit easily carried in the pocket of a bicycle rider or attached to the bike or rider in a pouch.

It is an object of the present invention to provide a improved multipurpose bicycle tool kit similar to that taught in my U.S. Pat. No. 4,967,435, only the immediate invention of this disclosure utilizes a plate-like web having either a plurality of open end or box style wrenches or sockets as a replacement for the adjustable open end wrench of my previous invention, with this being in part to reduce manufacturing costs and the risk of possibly rounding off a nut or bolt head with an incorrectly gaped adjustable wrench of my prior art tool kit.

BRIEF DESCRIPTION OF THE DRAWINGS

While the novel features of my immediate invention are set forth with particularity in the appended claims, the invention will be better understood along with other features thereof from the following detailed description taken in conjunction with my referenced prior art patent and with the drawings herewith included, in which;

DESCRIPTION OF THE PREFERRED EMBODIMENTS

Figure 1:
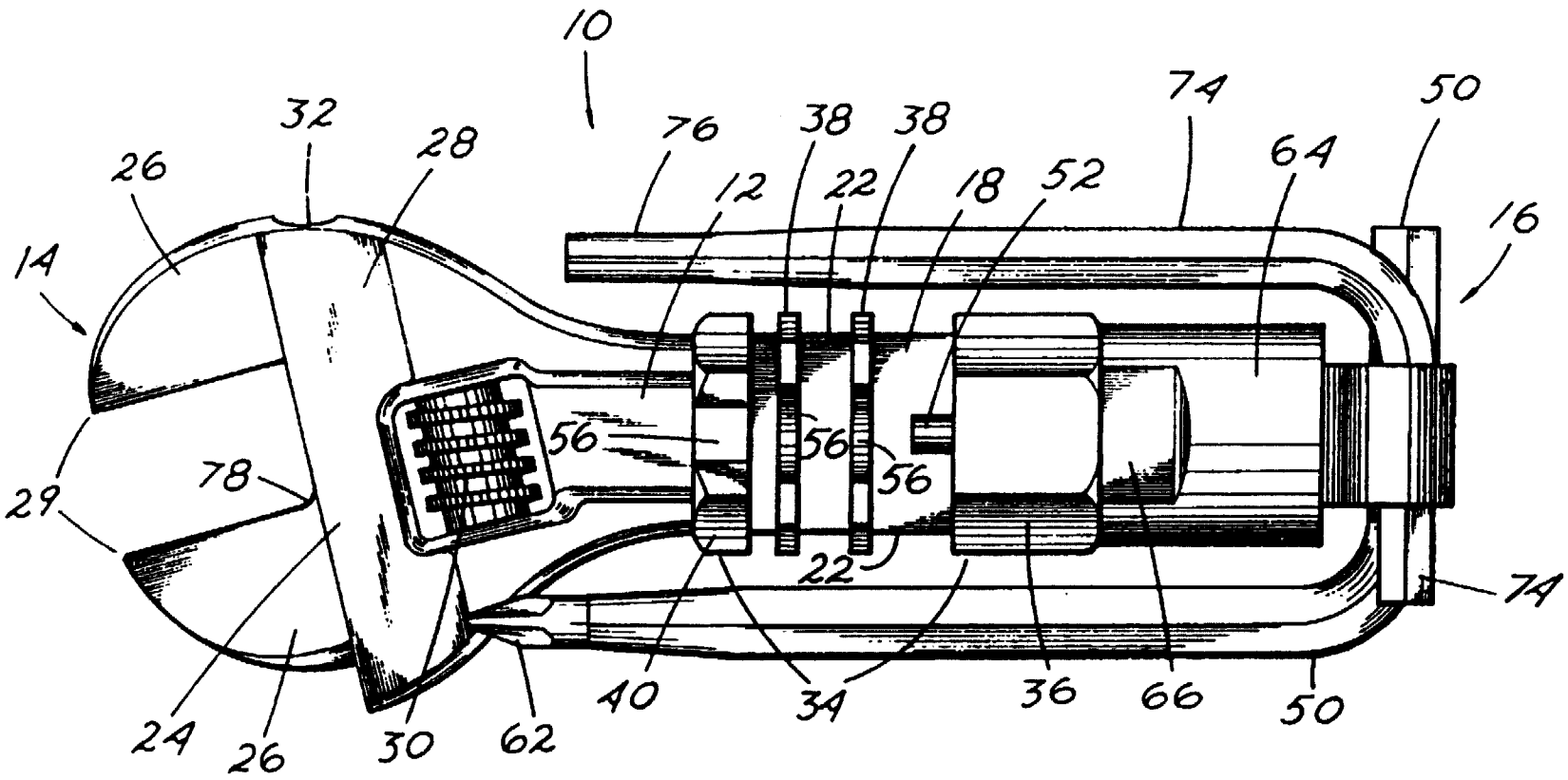
Fig. 1 (PRIOR ART)
FIG. 1 is a top plan view of the prior art multipurpose bicycle tool kit of the referenced patent.
Figure 2:
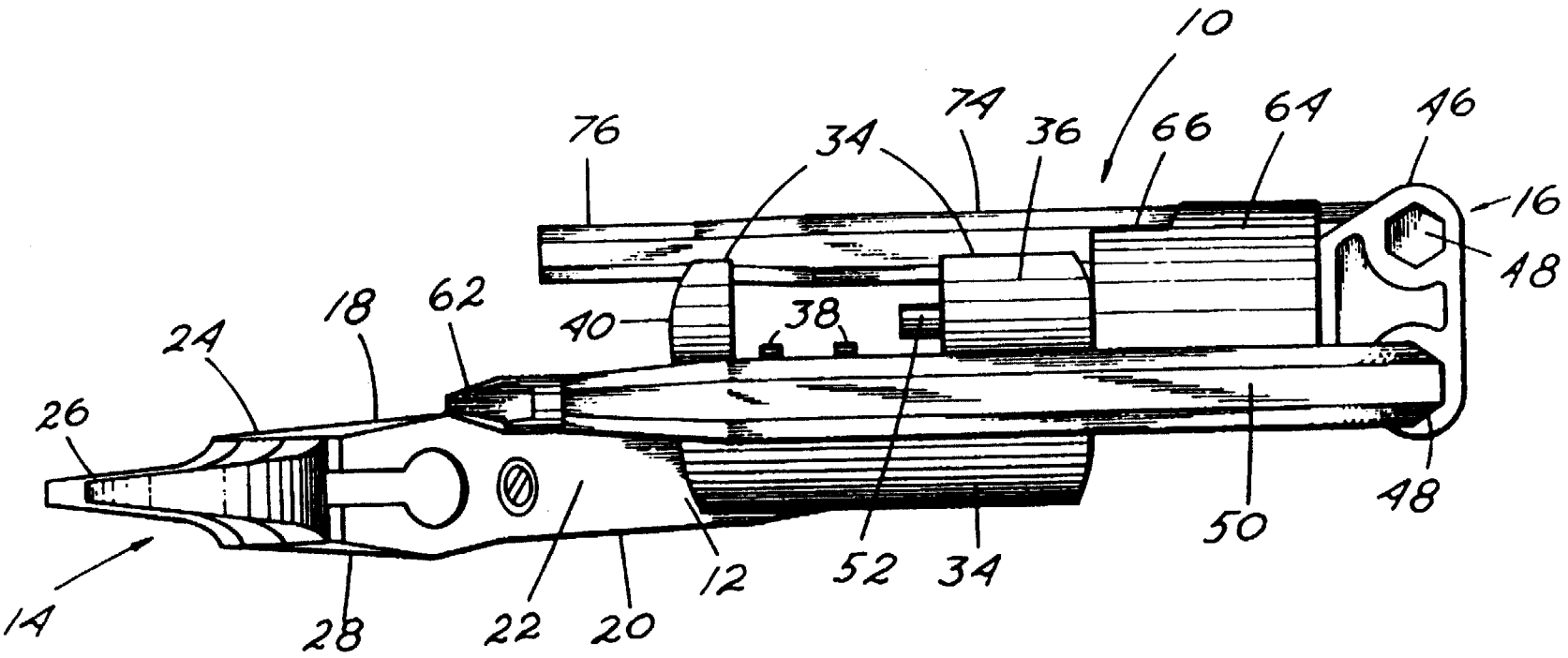
Fig. 2 (PRIOR ART)
FIG. 2 is a side view of the prior art of FIG. 1.
Figure 3:
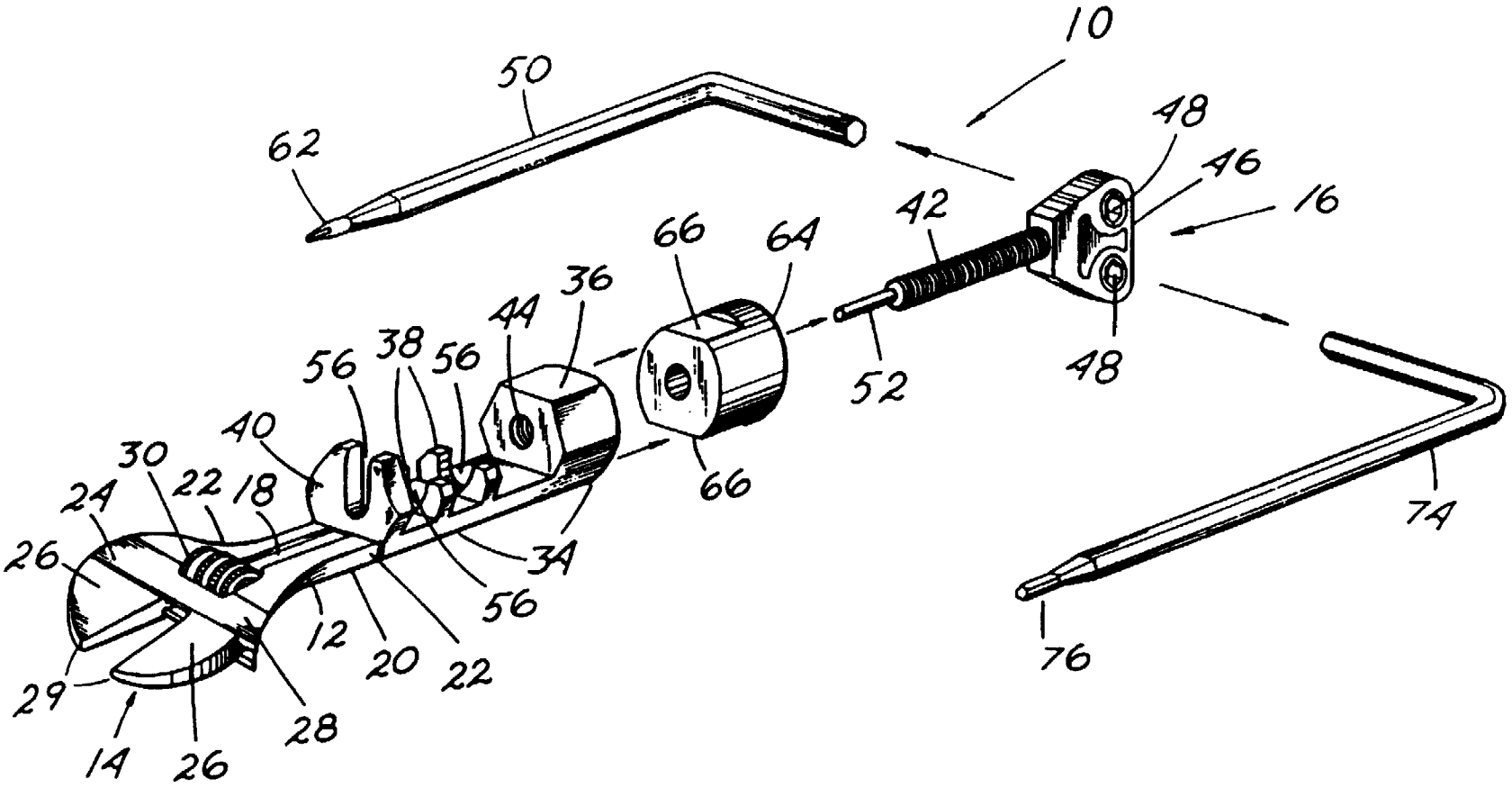
Fig. 3 (PRIOR ART)
FIG. 3 is a perspective exploded view of component parts of the prior art of FIG. 1.
Figure 4:
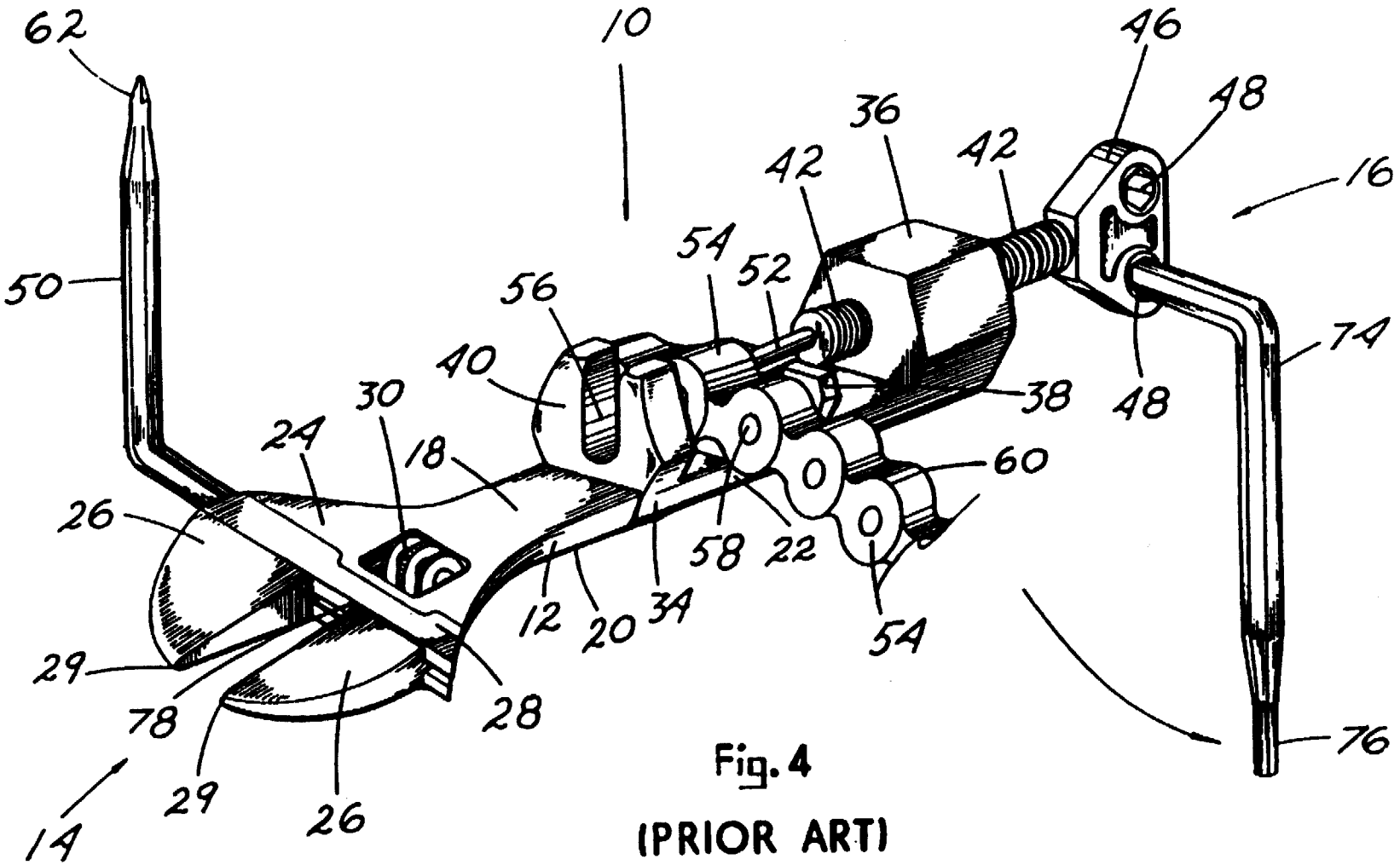
Fig. 4 (PRIOR ART)
FIG. 4 is an in-use view of the prior art tool of FIG. 1 illustrating the chain link remover disconnecting a link from a portion of a bicycle chain.

Referring initially to FIGS. 1 through 9 for a brief description of my prior art tool kit of the reference patent where a multipurpose bicycle tool kit lo is illustrated in various views. Multipurpose bicycle tool kit 10 is comprised of an elongated handle 12 having a first end 14, a second end 16, a top surface 18, a bottom surface 20, and two narrow lateral angled sides 22. Attached to first end 14 of handle 12 is the head of a small modified adjustable open end wrench 24. Jaws 26 are narrow gauge, slopping from a wide affixment in jaw support structure 28 to narrow jaw gripper ends 29 with at least one of jaws 26 being mobile and the opening between jaws 26 being adjustable by finger-turned jaw opening adjuster 30. The top surface 18 of handle 12 is affixed with chain link remover 34. Chain link remover 34 comprises shaft guide head 36, two link support members 38, anvil 40, and link ejector rod 52. Shaft guide head 36 is a short widened hexagon shaped base section having a flat vertical front end and a flat vertical back end which is opened in the middle through both ends by central threaded bore 44. A threaded shaft 42 useful as a chain link pin 58 remover can be screwed in and out through central threaded bore 44. Link support members 38 are U-shaped and sized to fit and retain links of bicycle chain 54 for chain link pin 58 removal which are pushed out through anvil 40 during bicycle chain repairs. Shaft guide head 36 is positioned adjacent second end 16 of handle 12 and central threaded bore 44 sized for receiving threaded shaft 42 passes through shaft guide head 36 as best illustrated in FIG. 3. Threaded shah 42 is an elongated cylindrical threaded rod attached to finger grip member 46, a generally rectangular handle head useful for screwing threaded shaft 42 in and out of central threaded bore 44 during chain work. Finger grip member 46 has two apertures 48 cut through its wider surfaces. Apertures 48 are each sized for releasably receiving one allen wrench 50 and one small sized allen wrench 74. The opposite end of threaded shaft 42 is affixed with link ejector rod 52, as seen in FIG. 3 and 4. Link ejector rod 52 is a short cylindrical rod shaped into the terminal free end of threaded shaft 42 sized smaller in diameter than threaded shaft 42. Positioned adjacent to shaft guide head 36. on top surface 18, are both link support members 38. Each link support member 38 has short narrow walls and is generally U-shaped with the U forming a concaved center. The sides of link support members 38 are angled similar to shaft guide head 36. Both link support members 38 are sufficiently spaced apart for securely receiving a portion of bicycle chain 54. Positioned next to link support members 38 towards first end 14 is anvil 40. Anvil 40 is about equal in diameter to shaft guide head 36 but is narrower in width. The sides of anvil 40 are also angled like shaft guide head 36. Anvil 40 contains a vertical slot 56, best shown in FIG. 4, sized for passage of link pin 58 of bicycle chain 54. The two allen wrenches previously mentioned, allen wrench 50 and small sized allen wrench 74, are modified allen wrenches provided in sizes normally useful on bicycle fittings. Both allen wrenches are removably retained in apertures 48 in triangular finger grip member 46. One allen wrench 50 has a distal end affixed with a Phillips screwdriver 62, the other, allen wrench 74, is smaller in size and has the distal end shaped into a further reduced size allen wrench 76. Although not shown, one arm of either allen wrench could be affixed with a flat blade screwdriver. Socket 64 is a socket ordinarily used with a driver as a socket wrench. Socket 64 is supplied in a size normally used to fit attachments on a bicycle. Modifications to socket 64 for purposes of the kit include two oppositely positioned socket flat wall surfaces 66 in the exterior wall of socket 64 giving jaws 26 of adjustable open end wrench 24 a positive gripping surface on socket 64 for using adjustable open end wrench 24 as a driver handle and socket 64 as a socket wrench. The interior bore of socket 64 is cut clear through and sized for sliding socket 64 over threaded shaft 42 for storage.

Figure 5:
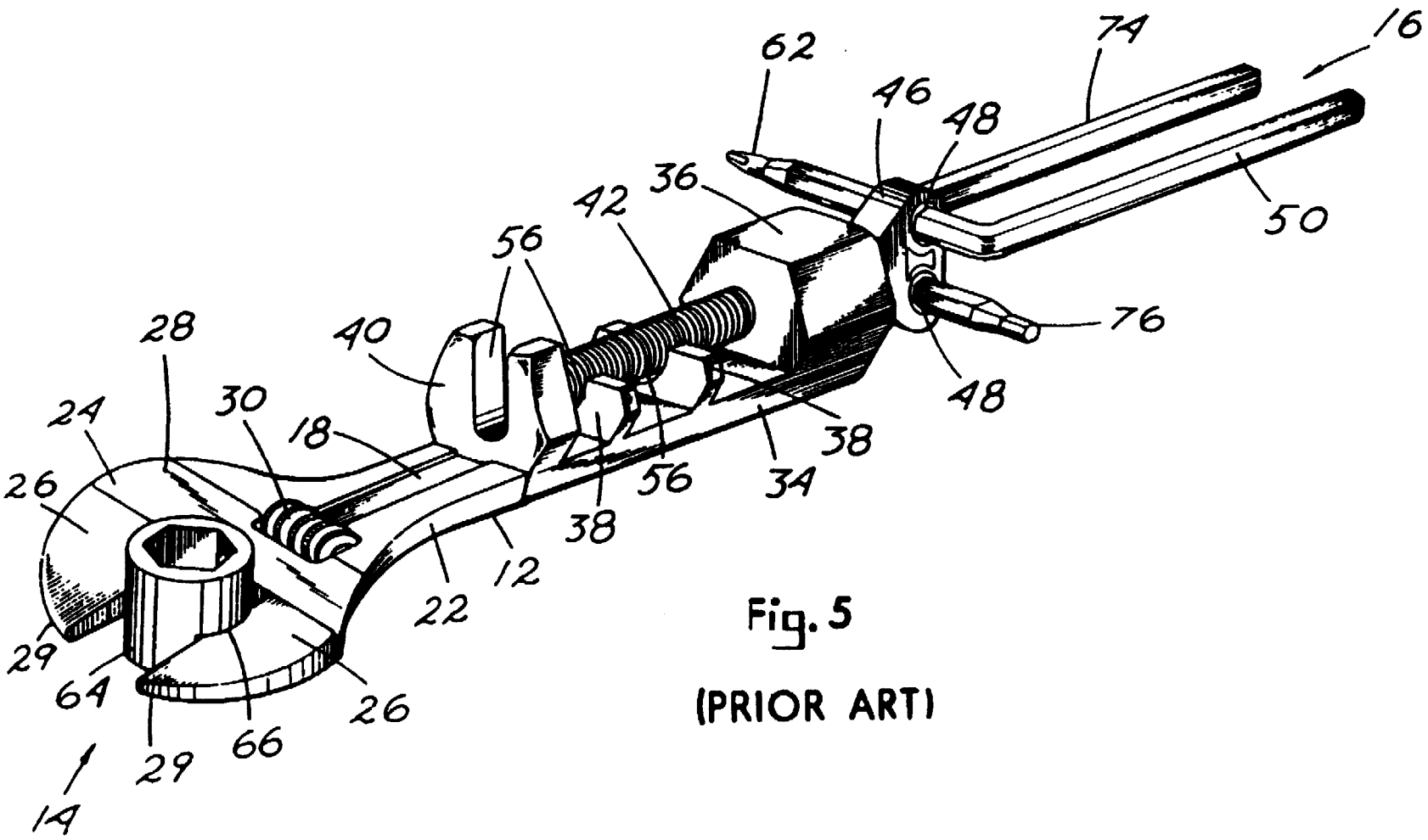
Fig. 5 (PRIOR ART)
FIG. 5 is a perspective view of the multipurpose bicycle tool kit of the referenced patent using the adjustable open end wrench jaws for holding a socket wrench.
Figure 7:
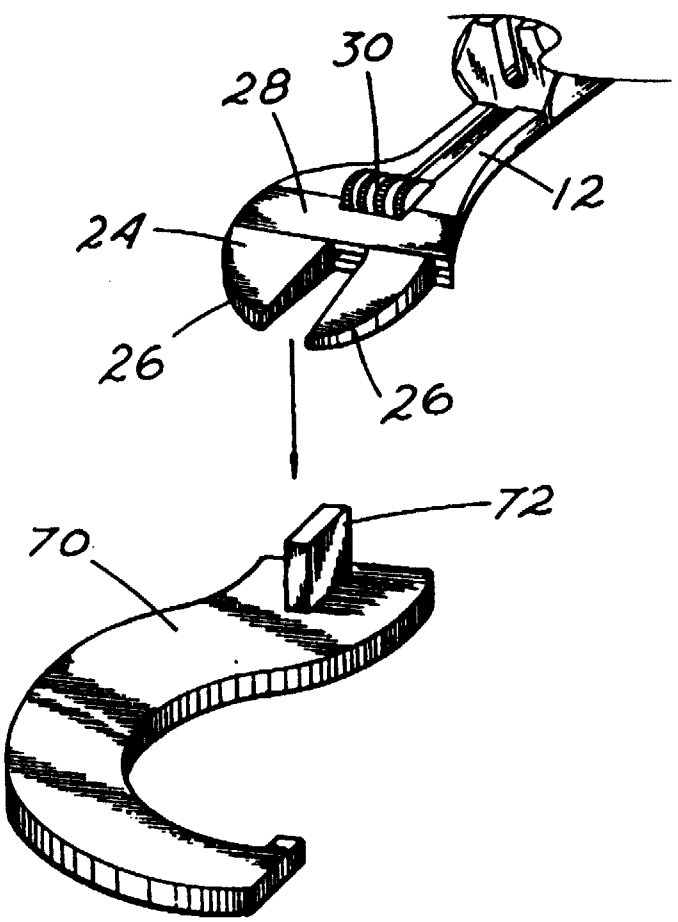
Fig. 7 (PRIOR ART)
FIG. 7 is a partial perspective view of the multipurpose bicycle tool kit of the referenced patent inclusive of a prior art accessory tool head having a surface fixture useful for grasping in the jaws of the adjustable open end wrench and using the adjustable wrench as a handle. The accessory tool of FIG. 7 is a flat hook-shaped wrench having a square tip angled back towards the opened hook area. This tool is particularly useful for manipulating a bicycle bottom bracket retainer nut.

To utilize socket 64, socket 64 is positioned between opposing jaws 26 aligning socket flat wall surfaces 66 with the flat adjacent edges of jaws 26, which prevents rotation of socket 64. To extend the length of handle 12 and increase leverage, threaded shaft 42 is fully inserted into central threaded bore 44 of shaft guide head 36 and both allen wrenches 50 and 74 inserted into apertures 48 with the longest sections of allen wrenches 50 and 74 projecting rearward in straight alignment with handle 12, as shown in FIG. 5. It is noted that apertures 48 are shaped to retain allen wrenches 50 and 74 in fixed positions relative to handle 12. For other levering, allen wrench 50 can also be inserted into aperture 32 in the top of jaw support structure 28 of jaws 26. Of particular note is that at least one of the two opposing jaws 26 of adjustable open end wrench 24 is modified with curve 78 adjacent jaw support structure 28 which is designed to fit and grasp bicycle spoke nipple 80 at the base of bicycle spoke 82 for adjusting spoke tension.

Figure 6:
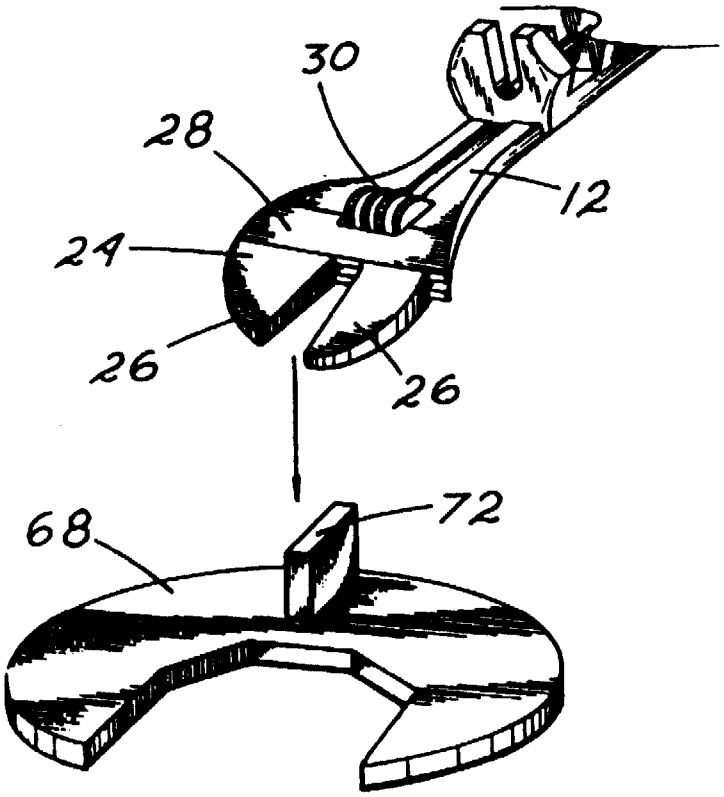
Fig. 6 (PRIOR ART)
FIG. 6 is a partial perspective view of the multipurpose bicycle tool kit of the referenced patent inclusive of a prior an accessory tool head having a surface fixture useful for grasping in the jaws of the adjustable open end wrench and using the adjustable wrench as a handle. The accessory tool of FIG. 6 is a flat open end wrench sized for tightening and loosening the headset nut on the head tube of a bicycle just below the handlebars.
Figure 8:
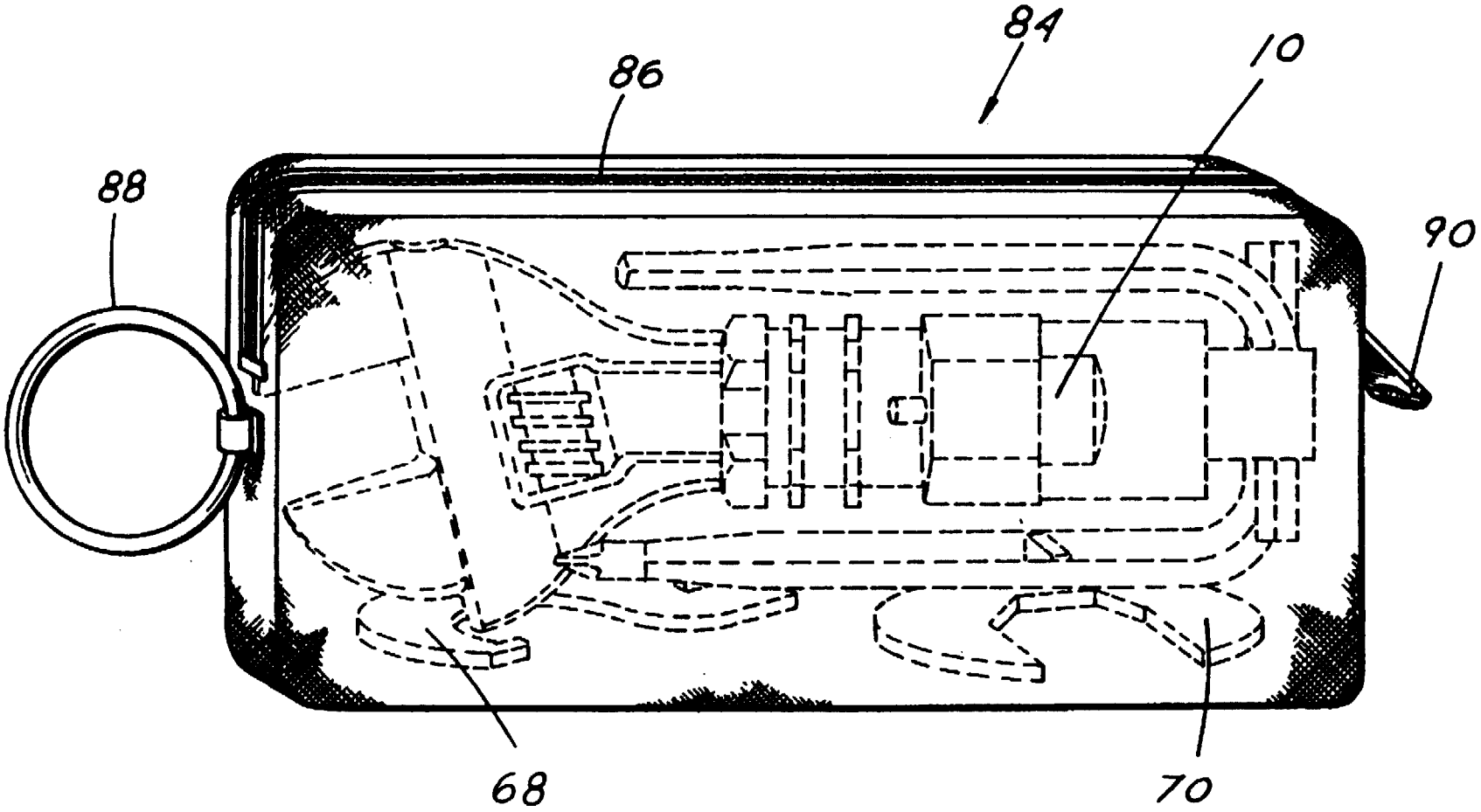
Fig. 8 (PRIOR ART)
FIG. 8 is of the multipurpose bicycle tool kit of the prior art referenced patent showing a carrying pouch useful for carrying the tool kit and accessory parts.
Figure 9:
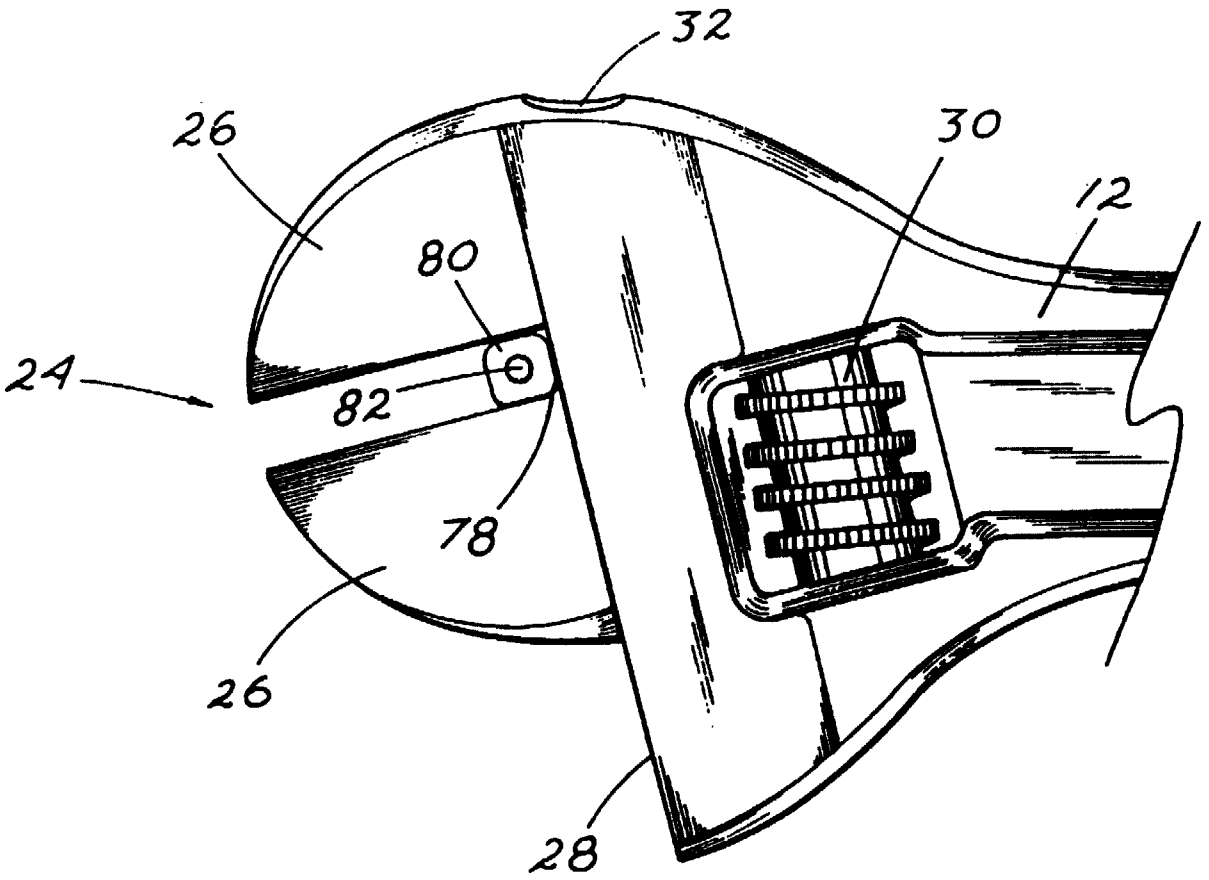
Fig. 9 (PRIOR ART)
FIG. 9 is a partial view of the multipurpose bicycle tool kit of the prior art referenced patent showing the opposing jaws of the adjustable open end wrench clamped onto a bicycle spoke nipple for adjusting spoke tension.

The component pans of this bike tool kit 10 are specifically selected and sized for making repairs and adjustments for the most common of bicycle breakdowns. For example, a full assortment of sockets 64 is not required since the most common of adjustments on the bicycle will only require a single size socket 64. For other nut adjustments, adjustable open end wrench 24 is available. This particular basic combination of tools is important to the effectiveness multipurpose bicycle tool kit 10. Two small optional accessory parts are illustrated and described herein for less frequently occurring break downs and adjustments. The first accessory part being headset wrench 68, a flat open end wrench head with gripping tab 72 on the surface for use with adjustable open end wrench 24. Headset wrench 68 is illustrated in FIG. 6. Headset wrench 68 is provided as a tool for tightening and loosening the headset nut on the head tube of a bicycle just below the handlebars. Although headset wrench 68 is available in different jaw sizes to fit different sized bicycle headset nuts, for kit compaction, it is suggested that the individual rider select the size useful for his particular headset. A second accessory pan is bracket bearing wrench 70, a hook-shaped wrench head having a square tip angled back towards the opened hook area, provided for removal and replacement of the bicycle bottom bracket retainer nut. Bracket beanng wrench 70 also has gripping tab 72 protruding from a plainer surface for use with jaws 26 of adjustable open wrench 24. See FIG. 7. The accessory parts, headset wrench 68 and bracket bearing wrench 70, can be included with the bicycle tool kit 10 in carrying pouch 84 as illustrated in FIG. 8. Carrying pouch 84 can be opened for interior access and the opening secured in a closed position by pulling zipper pull tab 90. Carrier ring 88 is illustrative of a carrying attachment for carrying pouch 84. Carrying pouch 84 is preferably provided with multipurpose bicycle tool kit 10 to prevent loss of accessory pans and of kit part should they become disassembled.

Referring now mainly to FIGS. 10 through 14 where my improved multipurpose bicycle tool kit of the immediate invention is shown in two slightly varied embodiments designated 92 A and 92 B, both of which are structured to be capable of performing generally all of the same functions as that of my multipurpose bicycle tool kit 10 of the prior art referenced patent. The multipurpose bicycle tool kits 92 A and B of the immediate invention are structured to be able to be manufactured at a lower cost, and additionally to provide for a more sure and accurate grasping of a nut or bolt head so as to reduce the incidents of rounded off nut or bolt heads, this being when compared to my multipurpose bicycle tool kit of the prior an referenced patent.

Multipurpose bicycle tool kits 92 A and B are substantially the same as multipurpose bicycle tool kit 10 of the prior art with the exception of adjustable open end wrench 24 of tool 10 having been eliminated and replaced with a plate-like web 94. Web 94 is a generally flat plate welded to or made as a one piece structure integral with handle 12 for both embodiments 92 A and B. The general flatness of 94 may be visually ascertained from FIG. 11, which although showing embodiment 92 A, is also representative of web 94 of embodiment 92 B. The main differences between embodiments 92 A and B are in that 92 B has a plurality of fixed sized open end sockets in web 94 shown in FIG. 10, and embodiment 92 B has a plurality of box style sockets and fixed sized open end sockets in web 94 shown in FIG. 12. The webs 94 of both embodiments 92 A and B each include a rectangular aperture or socket 96 sized to releasably receive the tabs 72 of the accessory headset wrench 68 and accessory bracket bearing wrench 70 as may be ascertained from FIG. 13 and 14.

Figure 10:
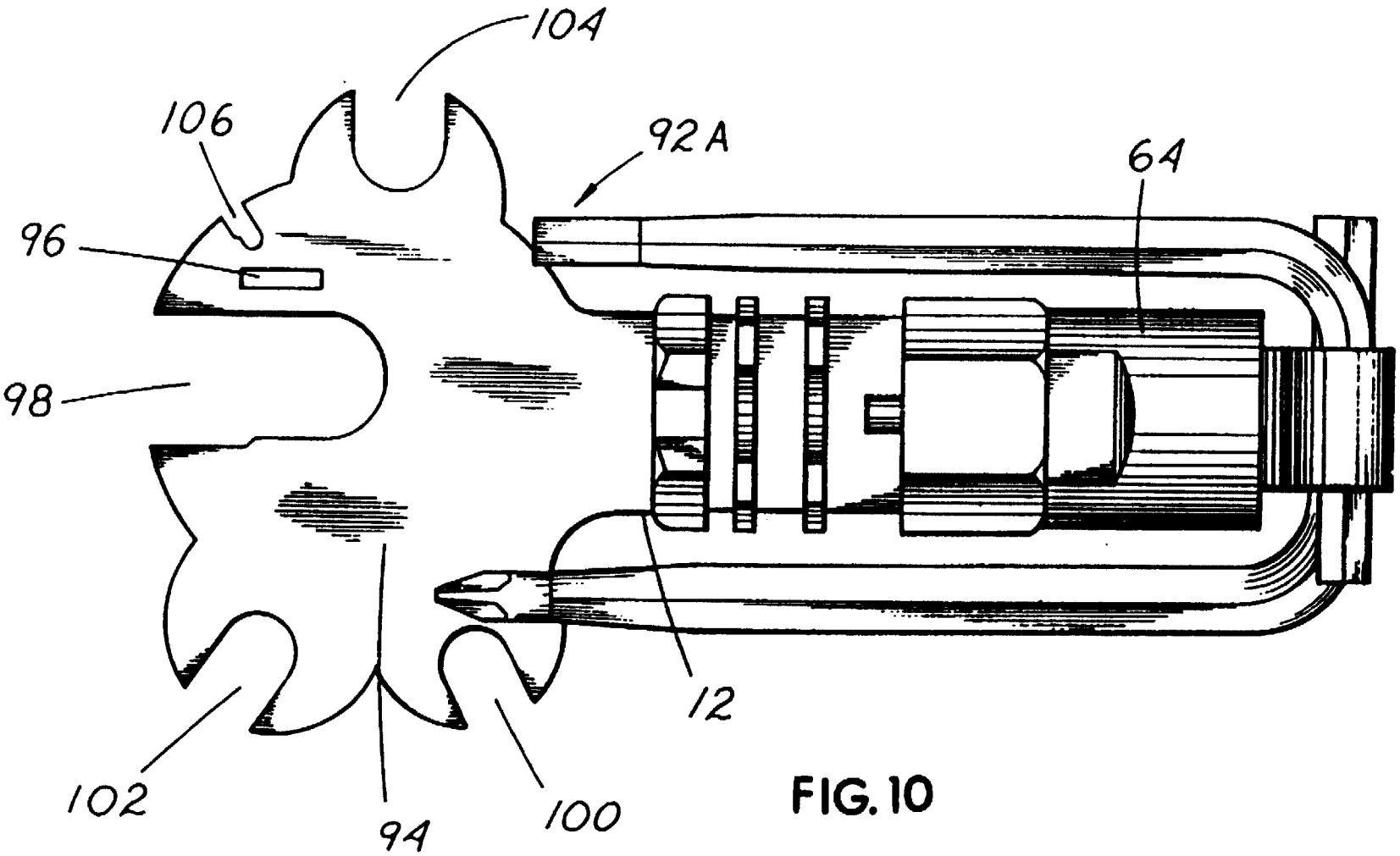
FIG. 10 is a top view of a first embodiment of the improved multipurpose bicycle tool kit of the immediate invention, wherein the adjustable wrench of the prior art tool has been eliminated and replaced with a plate-like web having a number of open end wrench sockets.
Figure 11:
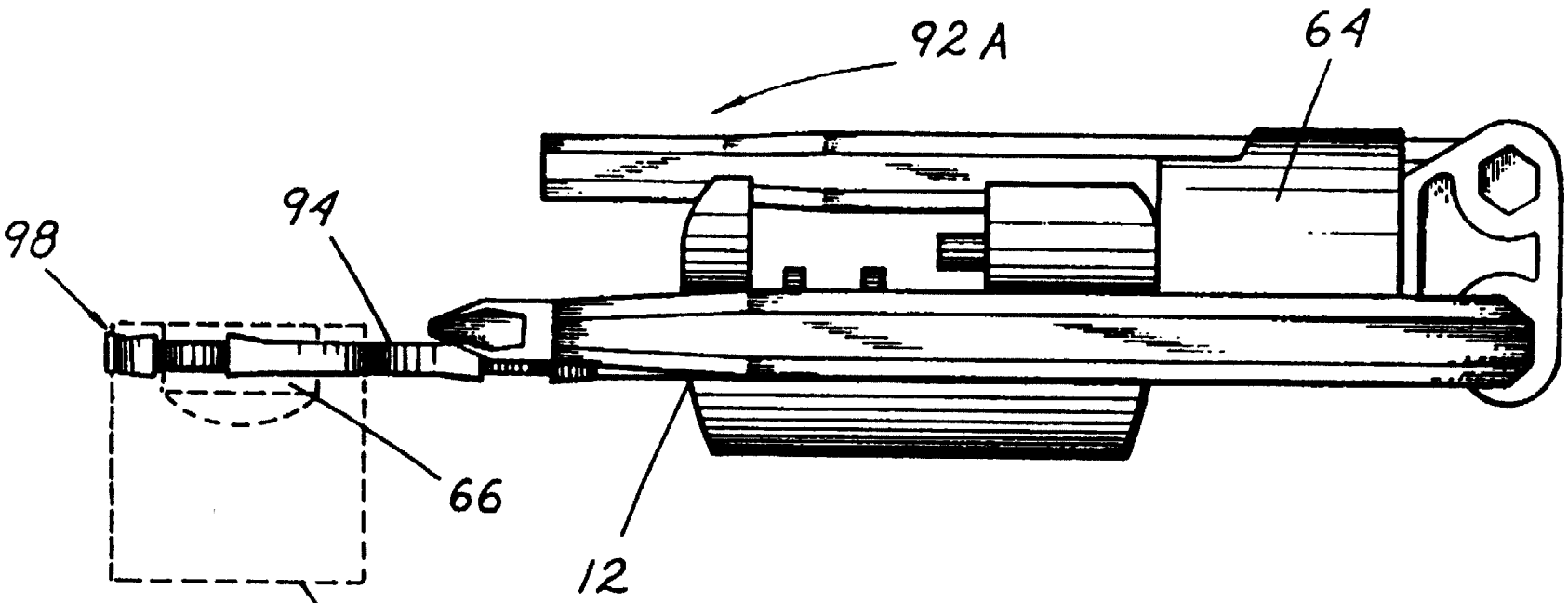
FIG. 11 is a side view of the first embodiment of the present invention shown in FIG. 10.

Referring now specifically to FIGS. 10 and 11 for a more detailed description of web 94 of embodiment 92 A. As shown in FIG. 10, web 94 has a plurality of open end wrench or sockets formed through web 94 for grasping various sizes of hex shaped nuts and bolt heads, and for grasping two sizes of spoke nipples. Additionally, the larger center socket 98 is sized to grasp socket 64 by spanning the flatten surfaces 66 of the socket 64 as may be ascertained from FIG. 11 where socket 64 is shown in dotted lines within socket 98. Socket 64 is useful for grasping and adjusting recessed nuts such as the crank nuts of a bicycle. Other open end sockets shown in FIG. 10 in web 94 are socket 100 which could be a 8 mm size: socket 102 which could be a 9 mm; and socket 104 which could be 10 mm. Web 94 additionally has a small open end socket 106 useful as a spoke nipple socket, which may be stepped or reduced to a smaller size in the rear area of the socket so as to be able to grasp 5 mm spoke nipples in the front area, and 4 mm spoke nipples in the reduced rear area beyond the 5 mm frontal area. The larger central socket 98 may also be sized for grasping two or more nut or bolt head sizes by way of having a wider front opening, say 16 mm for example, and a reduced rear area for 15 mm nuts for example.

Figure 12:
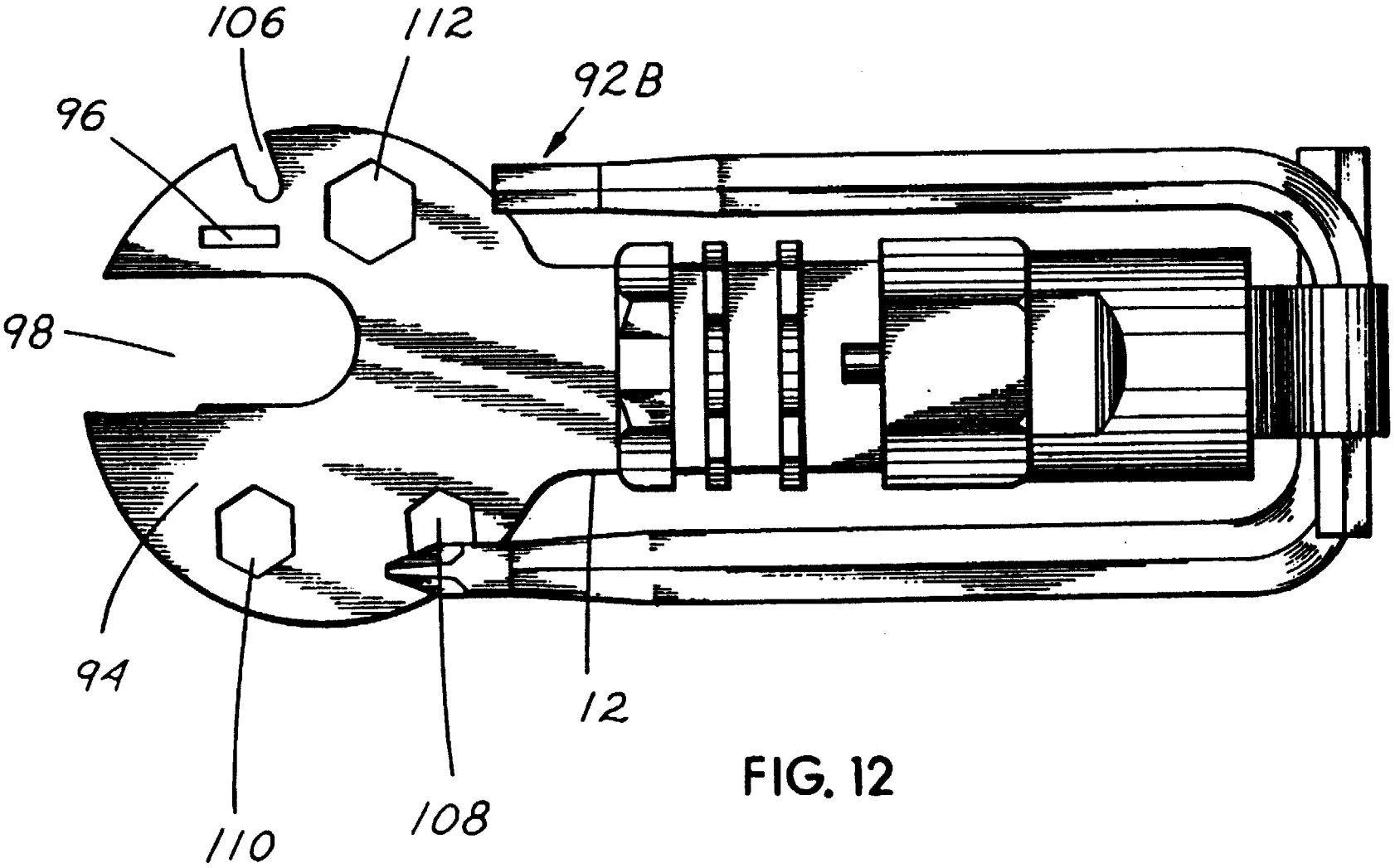
FIG. 12 is a top view of a second embodiment of the improved multipurpose bicycle tool kit of the immediate invention, wherein the adjustable wrench of the prior art tool has been eliminated and replaced with a plate-like web having a number of both open end and box style wrench sockets.
Figure 13:
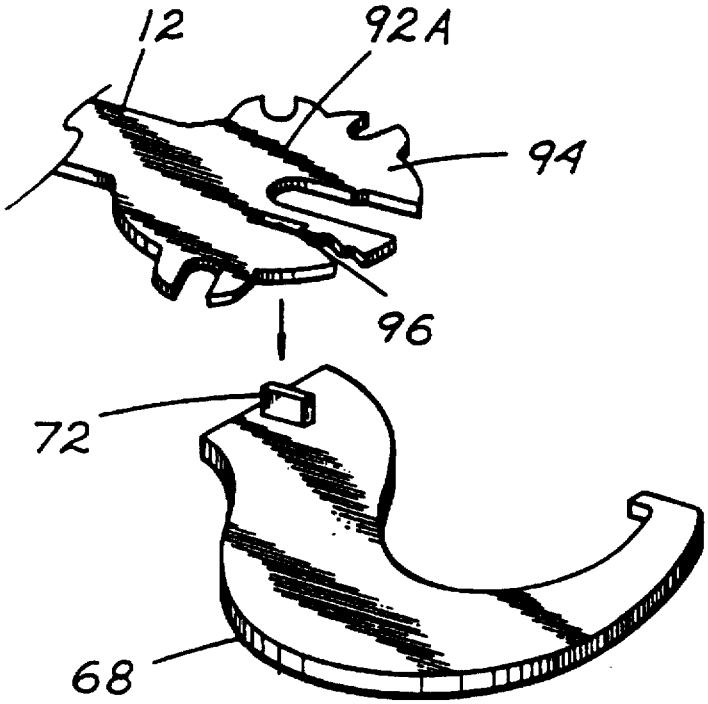
FIG. 13 illustrates the wrench head of the first embodiment of the present invention in position for attachment to a large open end wrench accessory.
Figure 14:
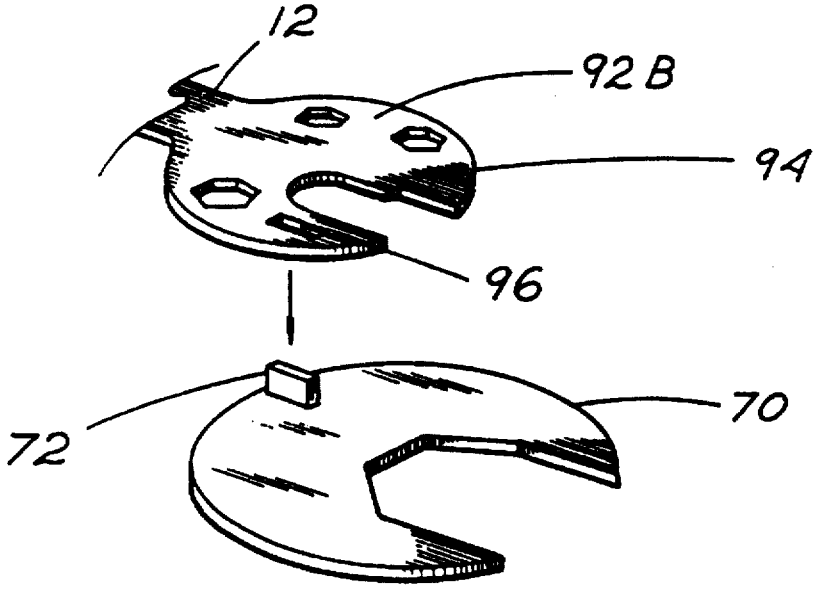
FIG. 14 illustrates the wrench head of the second embodiment of the present invention in position for attachment to a large open end wrench accessory.

Referring now mainly to FIG. 12 for a more detailed description of web 94 of embodiment 92 B. As shown in FIG. 12, web 94 has a plurality of both open end wrench or sockets and box style sockets formed through web 94 for grasping various sizes of nuts and bolt heads, and for grasping two sizes of spoke nipples. Additionally, the larger center socket 98 of embodiment 92 B is also sized to grasp socket 64 by spanning the flatten surfaces 66. Socket 98 may also be sized for grasping two or more nut or bolt head sizes by way of having a wider front opening, say 16 mm for example, and a reduced rear area for 15 mm nuts for example. Other sockets shown in FIG. 12 in web 94 are box socket 108 which could be 8 mm; box socket 110 which could be 9 mm; and box socket 112 which could be 10 mm. Web 94 of embodiment 92 B also has a socket 106 useful as a spoke nipple socket, which may be stepped or reduced to a smaller size in the rear area of the socket so as to be able to grasp 5 mm spoke nipples in the front area, and 4 mm spoke nipples in the reduced rear area beyond the 5 mm frontal area.

The web 94 of both embodiments 92 A and B is made of substantially rigid and strong material such as steel or aluminum, however both handle 12 and web 94 of both embodiments could be made of any sufficiently strong material such as rigid plastic, carbon fiber materials, metal alloys, or titanium to name just a few possibly suitable materials. Additionally, both embodiments 92 A and B are sufficiently small and compact to fit into a small carrying pouch such as my carrying pouch 84 shown in the prior art drawing FIG. 8.

Although I have very specifically described the preferred structures of my invention, particularly when taken in conjunction with my referenced patent, it should be understood that the specific details are just examples. For instance, the specific sizes of the particular sockets in web 94 may be suitable for some bicycles, while other bicycles will require either different metric sizes, or even none metric sizes. Additionally, under some circumstances I may choose to either add more sockets or reduce the number of sockets in web 94. In other words, many minor changes in the specific structures described may obviously be made without departing from the scope of the invention, and therefore it should be understood that the scope of the invention is not to be limited by the specification and drawings given for example, but is to be determined by the spirit and scope of my appended claims.

What I claim is:

1. A multipurpose bicycle tool kit comprising in combination:

an elongated handle;

a plate-like web attached to and extending from a first end of said handle, said web having a plurality of sockets therein to provide means for grasping a variety of sizes of nuts and bolt heads;

a bicycle chain link remover attached to said handle, said bicycle chain link remover including a shaft guide head, at least one link support member, an anvil, and a threaded shaft formed into a link ejector rod at one end and being adapted for screw adjustment by manual rotation of a finger grip member affixed at an opposite end with raid screw adjustment provided by a threaded bore centrally passaged through said shaft guide head;

said finger grip member being positioned at a second end of said handle, said finger grip member having at least two apertures sized to removably accept at least two different allen wrenches and to maintain said at least two different allen wrenches in fixed positions;

said at least two different allen wrenches each structured at one terminal end into a secondary tool;

a socket having an interior bore opened therethrough adapting said socket for slide over storage on said threaded shaft of said bicycle chain link remover, said socket adapted by oppositely positioned flat side wall sections for gripping by at least one of said sockets in said plate-like web.

2. The multipurpose bicycle tool kit of claim 1 wherein said at least two different sized allen wrenches each structured at one terminal end into a secondary tool, said secondary tool on at least one of said allen wrenches being a Phillips screwdriver.

3. The multipurpose bicycle tool kit of claim 1 wherein said at least two different sized allen wrenches each structured at one terminal end into a secondary tool, said secondary tool on at least one of said allen wrenches being a reduce sized allen wrench.

4. The multipurpose bicycle tool kit of claim 1 further including at least one socket in said plate-like web sized for grasping a spoke nipple.

5. A multipurpose bicycle tool kit comprising in combination:

an elongated handle;

a plate-like web attached to and extending from a tint end of said handle, said web having a plurality of sockets thereto to provide means for grasping a variety of sizes of nuts and bolt heads;

a bicycle chain link remover attached to said handle, said bicycle chain link remover including a shaft guide head, nt least one link support member, an anvil, and a threaded shaft formed into a link ejector rod at one end and being adapted for screw adjustment by manual rotation of a finger grip member affixed at an opposite end with said screw adjustment provided by a threaded bore centrally passaged through said shaft guide head;

said finger grip member being positioned at a second end of said handle, said finger grip member having means for, removably retaining at least two different allen wrenches; and, a socket sized for gripping by at least one of said sockets in said plate-like web.

6. A multipurpose bicycle tool kit comprising in combination:

an elongated handle;

a plate-like web attached to and extending from a first end of said handle, said web having a plurality of sockets therein to provide means for grasping a variety of sizes of nuts and bolt heads;

a bicycle chain link remover means attached to said handle;

at least two different allen wrenches; *and* means for retaining said at least two different allen wrenches adjacent said chain link remover means[; at least one of said at least two different allen wrenches having a screwdriver tip].

*7. The multipurpose bicycle tool kit of claim 6 wherein at least one of said at least two different allen wrenches has a screwdriver tip.*

*8. The multipurpose bicycle tool kit of claim 6 wherein said chain link remover means extends from a second end of said handle.*

*9. A multipurpose bicycle tool kit comprising in combination:*

*an elongated handle;*

*a plate-like web attached to and extending from a first end of said handle, said web having a plurality of sockets therein to provide means for grasping a variety of sizes of nuts and bolt heads;*

*a bicycle chain link remover means attached to said handle; and*

*at least one allen wrench disposed adjacent said chain link remover means.*

*10. The multipurpose bicycle tool kit of claim 9 wherein said at least one allen wrench has a screwdriver tip.*

*11. The multipurpose bicycle tool kit of claim 9 wherein said chain link remover means extends from a second end of said handle.*

* * * * *